United States Patent
Simpson et al.

(10) Patent No.: US 7,145,686 B2
(45) Date of Patent: Dec. 5, 2006

(54) WEB-BASED IMAGING DEVICE SERVICE INFLUENCED BY ACCESSORIES

(75) Inventors: Shell S. Simpson, Boise, ID (US);
Deuce James Hodgis DuBois, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1197 days.

(21) Appl. No.: 09/999,425

(22) Filed: Oct. 31, 2001

(65) Prior Publication Data
US 2003/0084114 A1    May 1, 2003

(51) Int. Cl.
G06K 15/00    (2006.01)
(52) U.S. Cl. .................................... 358/1.18; 719/329
(58) Field of Classification Search .............. 358/1.15, 358/3.28, 1.18, 1.12; 719/311, 329; 709/224; 717/173, 178; 707/205
See application file for complete search history.

(56) References Cited

U.S. PATENT DOCUMENTS

| | | | | |
|---|---|---|---|---|
| 2003/0011801 A1* | 1/2003 | Simpson et al. | ............ | 358/1.13 |
| 2003/0048470 A1* | 3/2003 | Garcia | ........................ | 358/1.15 |
| 2003/0081788 A1* | 5/2003 | Simpson et al. | ............ | 380/278 |
| 2003/0083952 A1* | 5/2003 | Simpson et al. | ............... | 705/26 |
| 2003/0084086 A1* | 5/2003 | Simpson et al. | ............ | 709/102 |
| 2003/0084151 A1* | 5/2003 | Simpson et al. | ............ | 709/225 |
| 2003/0112460 A1* | 6/2003 | Simpson et al. | ........... | 358/1.15 |
| 2004/0205493 A1* | 10/2004 | Simpson et al. | ......... | 715/501.1 |

FOREIGN PATENT DOCUMENTS

| | | |
|---|---|---|
| EP | 1079299 | 8/2000 |
| JP | 07230372 | 8/1998 |

OTHER PUBLICATIONS

U.S. Appl. No. 09/712,336, filed Nov. 13, 2000, Shell S. Simpson.
U.S. Appl. No. 09/874,184, filed Jun. 4, 2001, Shell S. Simpson.
U.S. Appl. No. 09/874,427, filed Jun. 4, 2001, Shell S. Simpson.
U.S. Appl. No. 09/924,058, filed Aug. 8, 2001, Shell S. Simpson.

* cited by examiner

Primary Examiner—Jerome Grant, II

(57) ABSTRACT

A web based imaging destination service requests web content from its paper handling accessories for a represented printing device and incorporates this content into the web content that it downloads into the client browser. In some embodiments, the printing device's destination service does not understand the web content coming from the accessory but simply integrates that content into the content it downloads. In some embodiments, the destination service synthesizes web content that is influenced by the accessories of the represented printing device. In a variation, the content coming from the accessory includes executable content. In a further variation, the executable content includes a means of collecting and conveying settings back to the printing device. In yet another variation, the accessory actually contains its own destination server that is accessed through the printing device's destination server.

29 Claims, 7 Drawing Sheets

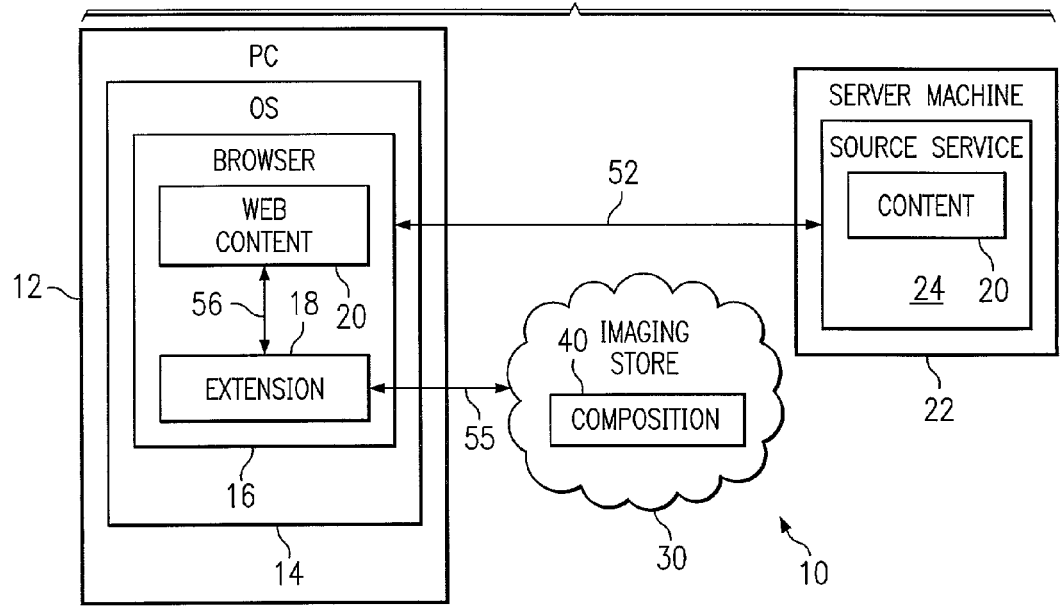
FIG. 1C
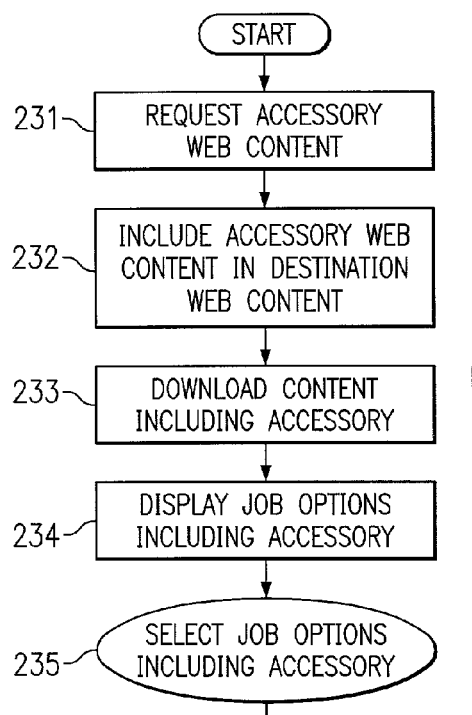
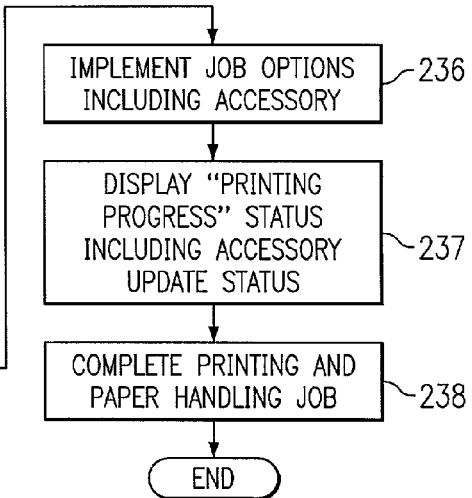
FIG. 2B

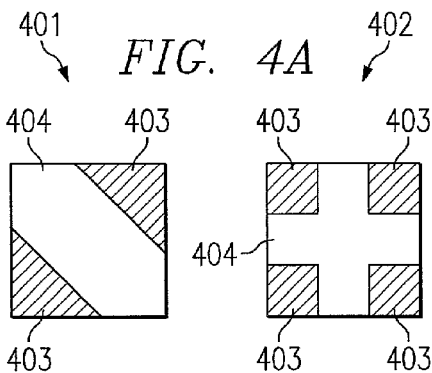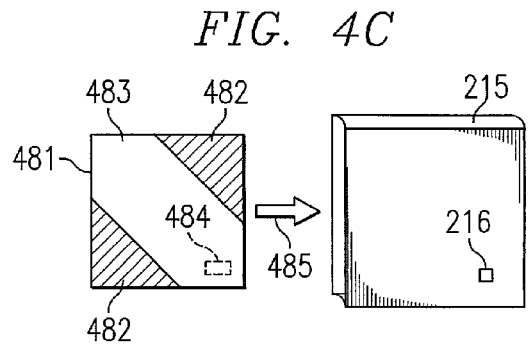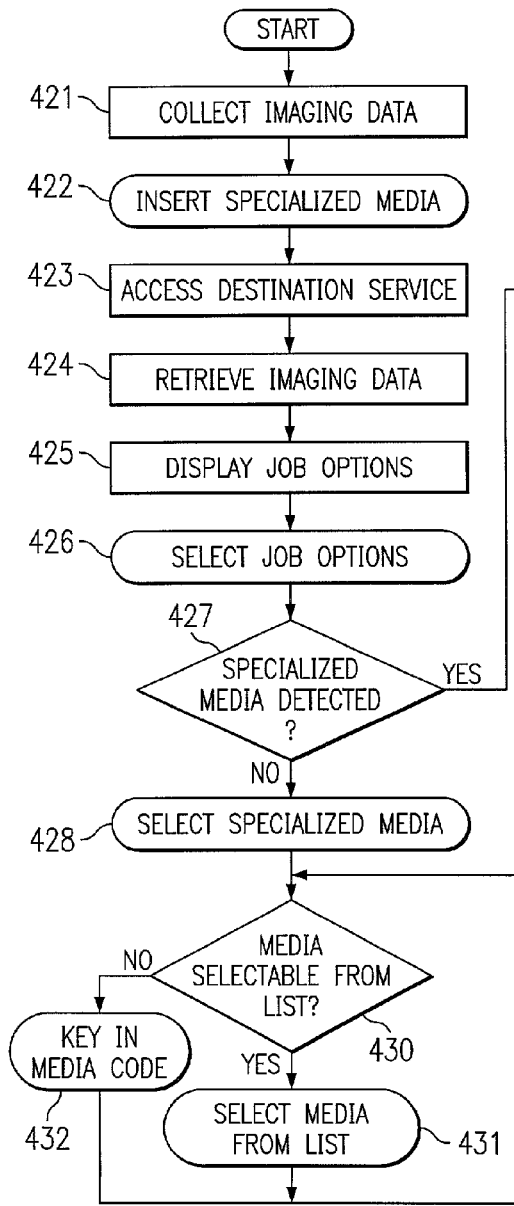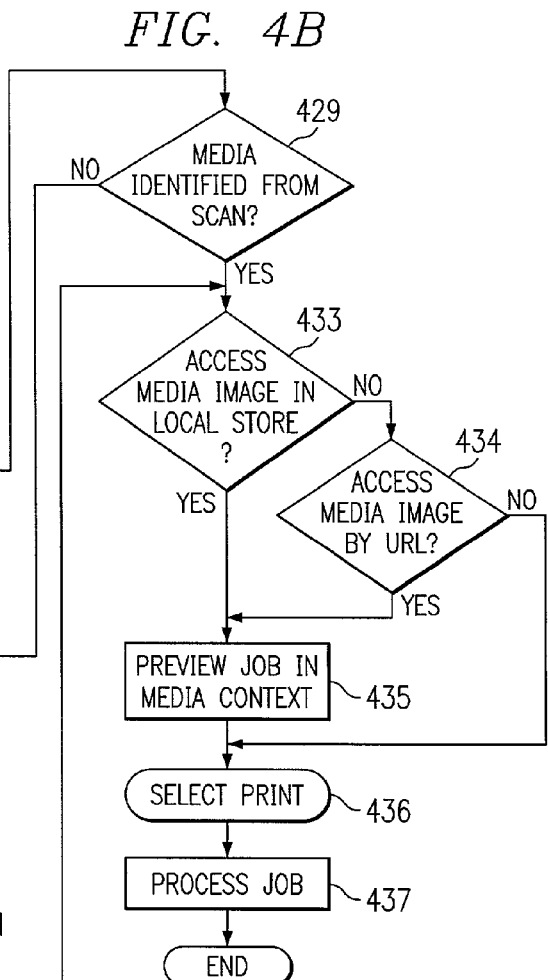

WEB-BASED IMAGING DEVICE SERVICE INFLUENCED BY ACCESSORIES

RELATED APPLICATIONS

The present application is related to co-pending and commonly assigned U.S. patent application Ser. No. 09/712,336 entitled "SYSTEM AND METHOD FOR PROCESSING DATA IN A DISTRIBUTED ENVIRONMENT," filed Nov. 13, 2000; co-pending and commonly assigned U.S. patent application Ser. No. 09/874,184 entitled "SYSTEM AND METHOD FOR PRINTING FROM A WEB APPLICATION," filed Jun. 4, 2001; co-pending and commonly assigned U.S. patent application Ser. No. 09/874,427 entitled "DYNAMIC PRODUCTION DEVICE REPRESENTATION IN A DISTRIBUTED ENVIRONMENT," filed Jun. 4,2001; and co-pending and commonly assigned U.S. patent application Ser. No. 09/924,058 entitled "SYSTEM AND METHOD AND PROGRAM PRODUCT FOR MULTIUSER PROFILE OPERATIONS AND GROUP COMPOSITION STORE" filed Aug. 8, 2001, the disclosures of which are all hereby incorporated herein by reference.

TECHNICAL FIELD

The invention relates to printing in a web based imaging environment and more particularly to a web based imaging device service influenced by accessories.

BACKGROUND

Currently an accessory, for example a paper-handling device associated with a printer, provides its capabilities to the printer, which in turn represents those capabilities to the outside world on its behalf. This is limiting, because the printer must be modified in order to represent unanticipated associated accessory capabilities.

Desktop computer applications typically either always attempt to collate, or always try to send multiple copies of the document to be printed. Existing desktop applications support collated printing only in a device- and platform-specific way. It would be advantageous in the art to have a system and method for collation and other associated accessory capabilities that are device-transparent and platform-independent.

SUMMARY OF THE INVENTION

The present invention is directed to a system and method in which a web based imaging destination service requests web content (or data that can be used to synthesize such content) from its associated accessories, e.g., paper handling devices, for a represented printing device and incorporates this content into the web content that it downloads to the client browser. In some embodiments, the printing device's destination service does not understand the web content coming from the associated accessory but simply integrates that content into the content it downloads. In some embodiments, the destination service synthesizes web content that is influenced by the accessories of the represented printing device.

In a variation, the content coming from the associated accessory includes executable content. In a further variation, the executable content includes a means of collecting and conveying settings back to the printing device. In yet another variation, the associated accessory actually contains its own destination server that is accessed through the printing device's destination server.

Technical advantages include enabling associated accessories to contribute web content into the content representing a printing device without the printing device having any specific knowledge about the accessory. This relieves the printer from needing specific knowledge of all possible associated accessory capabilities. Since the associated accessory represents itself by providing web content, it is free to represent many capabilities, for example saddle stapling, glue binding, cutting, and stacking

BRIEF DESCRIPTION OF THE DRAWING

FIG. 1C is a schematic diagram illustrating in more detail various aspects of the network of FIG. 1A, in accordance with embodiments of the present invention;

FIG. 2B is a flow diagram depicting the operation of a first aspect of enhanced paper handling, according to embodiments of the present invention;

FIG. 4A is a schematic representation of specialized media;

FIG. 4B is a flow diagram depicting the operation of a system and method of printing with specialized media, in accordance with embodiments of the present invention;

FIG. 4C is a schematic representation illustrating an implementation for scanning encoded specialized media, in accordance with the present invention;

GLOSSARY OF TERMS AND ACRONYMS

Figure 1A:
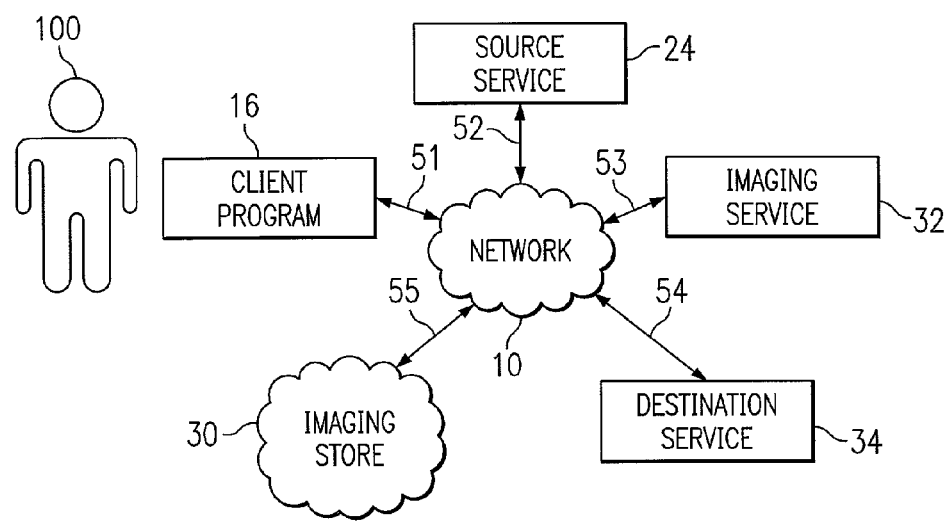
FIG. 1A is a simplified schematic diagram representing a logical overview of a typical web-based imaging system, in accordance with embodiments of the present invention.

The following terms and acronyms are used throughout the Detailed Description:

"API". An application programming interface (API) is a library of programmatic methods provided by a system of some kind (an example is a web-based imaging system, as in the present invention) that enables client programs (web application content operating within the browser is one example) to interact with that system. One method of creating an API is to create a library. For example, in JAVA™, a library (conventionally called a jar file) is created by defining a class or classes, compiling the class or classes, and grouping the class or classes into a library. For example, the following class could be created:

```
class BaseConversionAPI {static public String convert-
   BaseToBase (String in Number, int inBase, int out-
   Base) {//Code for returning a string representing
   inNumber converted to outBase}}
```
That class would then be compiled with the command:
java.exe BaseConversionAPI .java NOTE: Programs are typically stored in text files, which are "compiled" in order to create "object files" which contain the executable (or interpretable) instructions. In this case, the program is contained in the file BaseConversion-APIjava. The act of compiling creates a file named "BaseConversionAPI.class" containing instructions for a specific computing architecture (in this case the JAVA™ Virtual Machine) corresponding to the program.

Next in this example, a Jar file would be created:
jar.exe cvf BaseConversionAPI.tar BaseConversionAPI.class This command creates a "library" file containing the BaseConversionAPI class. This last step is not absolutely required. In some instances, API's are provided as simply files containing executable instructions (such as the BaseConversionAPI.class file).

References regarding the creation of API's:
http://www.library.yale.edu/orbis2/public/activity/AP.html Note that the API's to network services (graphic store, composition store, and user profile store, all to be discussed below) would be created to be accessible through a remote invocation technology such as CORBA, JAVA™-RMI, DCOM™, RPC, or SOAP. A wide variety of printed references are available that describe how API's can be created to be accessible through a remote invocation technology, such as one of the technologies noted above.

"Client-Server". A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

"Composition." Composition, also referred to as a "graphics composition," comprises a file with links to graphic data serviced as a single unit, i.e., a graphic. The file also usually includes information on the placement of those graphics on a sequence of canvases. It describes how to combine one or more graphics from one or more sources onto a sequence of canvasses, in a variety of different ways. The use of compositions allows multiple compositions to reference a graphic in a graphic store without having to duplicate the graphic.

"Composition store". Composition store refers to a service (ideally implemented as a network service) that stores and provides access to imaging composition(s) that can be accessed by the user or web services. In this context, providing "access" includes providing methods for building compositions, modifying compositions, and accessing them piecemeal. For example, a set of methods available for execution via the composition store might include the methods Get a Composition, Create a Composition, Delete a Composition, and Modify a Composition.

"Content." A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, JAVA™ applet, JavaScript™ and C-"Sharp" code.

"Exchange infrastructure." An exchange infrastructure is a collection of services distributed throughout a network that store imaging data associated with a particular user through a user profile.

"Firewall." A firewall filters out unwanted communication packets in one or more directions. By way of example, in one implementation of a firewall, requests from inside a firewall may be made to access data on the outside of the firewall, and responses to such requests are typically permitted. Communications initiated from outside the firewall to devices inside of the firewall are typically not permitted. Generally, the firewall may be implemented by a firewall proxy server that allows devices inside the firewall to pass HTTP requests to web servers outside the firewall. Obviously, other protocols may be used to implement communication through the firewall.

"Generic access instructions." A generic access instruction refers to an executable instruction that is intended to cause the executing device to generate generic access requests in order to access a set of target graphic data. These instructions call methods provided by, for example, an imaging extension, but are executing within a JVM/JAVA™ or similar environment (which the imaging extension is part of). Methods provided by the environment in which the program is executed are typically called an "application Programming Interface" (API). Note that a generic access instruction does not include the location of the target graphic data. Typically, the target graphic data is pre-selected (generally by a user) and its location is determined from information that is maintained locally within the executing device.

For purposes of this application, the term "generic access instruction" refers to an executable instruction that is intended to cause the executing device to generate generic access requests in order to access a set of target data. A generic access instruction, however, does not include the location of the target data itself and neither does the generic access requests. Importantly, the target data is pre-selected (typically by a user) and its location is determined from information that is maintained locally within the executing computer. For this reason, the target data for a particular computer is said to be "associated" with that computer. Thus, for example, the target data that is associated with computer "A" is the data that computer "A" will access in response to a generic access instruction. The target data that is associated with computer "B" is the data that computer "B" will access in response to the identical generic access instruction.

Furthermore, in the case wherein the target data represents an image, that image is referred to herein as the "target image." In this simplified example, it will be assumed that all generic access instructions specified by the system wide standard mentioned above are for accessing data that describes an image.

"Graphic data." Graphic data refers to digital data capable of being represented as two dimensional graphics, such as a Portable Document Format ("PDF") file or a Joint Photographic Experts Group ("JPEG") file.

"Graphic store." Graphic store refers to a network service or a storage device for storing graphics data that can be accessed by the user or other network services. The graphic store preferably accepts the graphic data in multiple standard file formats, and the graphic data is converted into these file formats when necessary depending on the implementation.

"Hyperlink." A navigational link from one document to another, from one portion (or component) of a document to another, or to a Web resource, such as a JAVA™ applet. Typically, a hyperlink is displayed as a highlighted word or phrase that can be selected by clicking on it using a mouse to jump to the associated document or document portion or to retrieve a particular resource.

"Hypertext System." A computer-based informational system in which documents (and possibly other types of data entities) are linked together via hyperlinks to form a user-navigable "web."

"HTML" (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see for example Ian S. Graham, The HTML Source Book, John Wiley and Sons, Inc., 1995 (ISBN 0471-11894-4).

"HTTP" (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

"Imaging composition." An imaging composition comprises links to imaging data serviced as a single unit.

"Imaging data." Imaging data refers to digital data capable of being represented as two dimensional graphics, such as a Portable Document Format ("PDF") file or a Joint Photographic Experts Group ("JPEG") file.

"Imaging data store." Imaging data store refers to a network service or a storage device for storing imaging data that can be accessed by the user or other network services. The imaging data store preferably accepts the imaging data in multiple standard file formats, and the imaging data is converted into these file formats when necessary depending on the implementation.

"Internet." A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

"PDA" (Personal Digital Assistant). A small hand-held computer used to write notes, track appointments, email and web browser with generally with far less storage capacity than a desktop computer.

"Personal imaging repository" A personal imaging repository is a conceptual term describing the exchange infrastructure used to exchange graphics composition and graphics data with web services. Users are associated with their graphics data through user profiles. It should be noted that the personal imaging repository 50 can represent any type or combination of data storage devices.

"URL" (Uniform Resource Locator). A unique address which fully specifies the location of a file or other resource on the Internet or a network. The general format of a URL is protocol: //machine address: port/path/filename.

"User Information." User information is identification and security information used in accessing graphics composition (s) and graphics data associated with a particular user profile. It is preferably accessed either directly or indirectly through methods provided by an extension component integrated into the web browser.

"User Interface." The junction between a user and a computer program providing commands or menus through which a user communicates with a program. For example, in the client-server model defined above, the server usually generates and delivers to a client a user interface for communicating with a program operating on or controlled by the server device. Where the server is a web server, the user interface is a web page. The web page when displayed by the client device presents a user with controls for selecting options, issuing commands, and entering text. The controls displayed can take many forms. They may include push-buttons, radio buttons, text boxes, scroll bars, or pull-down menus accessible using a keyboard and/or a pointing device such as a mouse connected to a client device. In a non-graphical environment, the controls may include command lines allowing the user to enter textual commands.

"World Wide Web" ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass WAP and WML for mobile phone web browsers, as well as other current and future markup languages and transport protocols which may be used in place of (or in addition to) HTML and HTTP.

"Web Site." A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

"Web service." A web service is intended to refer to a service that is provided (at least in part) by a web server. But a web service is a broader concept than a web server. In this regard, a "Web server" is a program that, using the client/server model and the World Wide Web's Hypertext Transfer Protocol (Hypertext Transfer Protocol), serves the files that form Web pages to Web users (whose computers contain HTTP clients that forward their requests). Every computer on the Internet that contains a Web site must have a Web server program. The most popular Web servers currently are Microsoft's Internet Information Server (Internet Information Server), which comes with the Windows NT server; Netscape FastTrack™ and Enterprise™ servers; and Apache, a Web server for UNIX-based operating systems. Other Web servers include Novell's Web Server for users of its NetWare™ operating system and IBM's family of Lotus Domino servers, primarily for IBM's OS/390™ and AS/400™ customers.

Web servers often come as part of a larger package of Internet- and intranet-related programs for serving e-mail, downloading requests for File Transfer Protocol files, and building and publishing Web pages. This larger package is referred to as the web service. Parameters for a Web server include how well it works with various operating systems and other servers, its ability to handle server-side programming, and publishing, search engines, and site building tools in the package.

DETAILED DESCRIPTION

FIG. 1A is a simplified schematic diagram representing a logical overview of a typical web-based imaging system, in accordance with embodiments of the present invention. User 100 interfaces with client program 16, typically a web browser, which is logically connected through data path 51 with network 10. Also logically connected with network 10 through respective data paths 52–55 are for example among other entities source service 24, an imaging service 32, destination service 34, and imaging store 30 (for further description of a source service, a destination service, and an imaging store see co-pending and commonly assigned U.S. patent applications Ser. Nos. 09/712336, 09/874184, 09/874427, and 09/924,058, cited above, the disclosures of which have been incorporated herein by reference). Network 10 can be any of a variety of network types, including for example Internet, Intranet, and Ethernet, and the transmission medium of network 10 and data paths 51–55 can include electrically conductive cable, optical fiber, semiconductor, wireless, or any combinations of these. Data paths 51–55 need not be physical links but can represent data flows through any media. In general a web-based imaging system can include multiple client programs 16, source services 24, destination services 34, and imaging stores 30 each interconnected with a network 10 and having a unique network address, typically represented by a Uniform Resource Locator (URL). Imaging service 32 is a logical entity providing client program 16 access to multiple destination services 34 by accessing and downloading interfaces, typically web pages conventionally generated using HyperText Markup Language (HTML) coding. Web documents are conventionally located and acquired throughout network 10 using HyperText Transfer Protocol (HTTP).

Figure 1B:
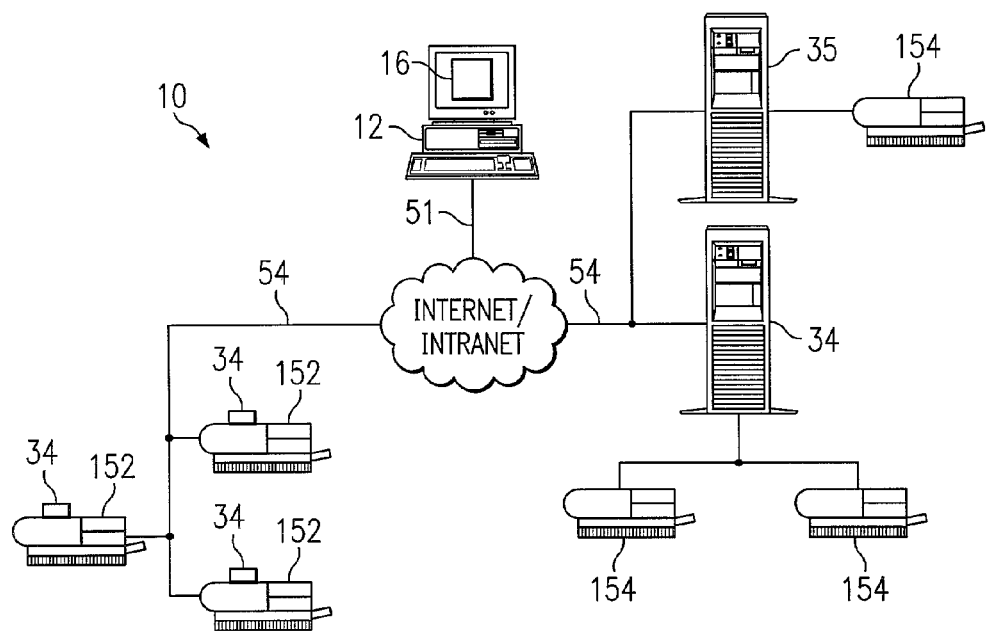
FIG. 1B is a simplified schematic diagram depicting various aspects of destination services, in accordance with embodiments of the present invention.

FIG. 1B is a simplified schematic diagram depicting various aspects of destination services 34, in accordance with embodiments of the present invention. A destination service 34 typically is a destination web service that represents one or more production devices 152, 154 on network 10. Production devices 152, 154 include printers; paper handling accessories such as binders, sorters, or folders; e-mail clients; facsimile devices; web servers; and data storage devices. Production devices are not, however, limited to those above, but may include any devices capable of electronically or physically saving, displaying, formatting, or transferring a target image. Some production devices perform a single type of service, for example printing, whereas other production devices perform multiple services.

A self-representing production device 152 contains an embedded destination service 34, which represents production device 152 on network 10, allowing production device 152 to be connected directly to network 10 and accessed directly by client program 16. Client program 16 is typically a web browser that runs in a client machine 12, commonly a desktop or laptop and potentially a handheld computer or personal digital assistant (PDA). On the other hand, a production device 154 such as a conventional printer is incapable of self-representation and consequently must be connected to and controlled by an external destination service 34 running on an intermediate device such as a desktop computer or a print server machine.

In some embodiments of the present invention, source service 24 generates a set of data representing a printable version of a target image, which includes a controlled symbol referring to a predetermined symbol set. Only when the printable version of the target image is accessed by an appropriate destination service that contains the predetermined symbol set, for example appropriate destination service 35, can the controlled symbol in the target image be produced or displayed. Any other destination service 34 not containing the predetermined symbol set, including for example destination services accessible through imaging service 32, can print or display at most only a proxy symbol in place of the controlled symbol, when printing or displaying the image. The data representing the printable version of the target image are referenced by a composition stored in imaging store 30, as described in more detail below.

FIG. 1C is a schematic diagram illustrating in more detail various aspects of network 10 of FIG. 1A, in accordance with embodiments of the present invention. Client program 16 running on operating system 14 in client machine 12 is logically interconnected through data path 52 of network 10 with source service 24, typically a source web service that runs on server machine 22 and generates interfaces, typically web content 20. When client program 16 browses to source service 24, web content 20, usually including executable content, is downloaded into the browser window of client program 16. Executable content 20 accesses imaging store 30 via application programming interfaces (APIs) contained in a modified imaging extension 18 of client program 16, for example through data paths 55 and 56. For further description of imaging extensions containing APIs see co-pending and commonly assigned U.S. patent applications Ser. Nos. 09/874184 and 09/924,058, cited above, the disclosures of which have been incorporated herein by reference. Modified imaging extension 18, described in more detail below, can be accessed by, for example, JAVA™ applets for accessing imaging store 30, although other web programming technologies can be used.

In some embodiments of the present invention, a preview version of the printable version of the target image is incorporated into web content 20 of accessed destination services 34, 35, including destination services 34 accessed through imaging service 32 which provides links to source and destination services, and is previewed to user 100 through client program 16 in the context of the capabilities of accessed destination services 34, 35. When user 100 selects the "print now" option, the entire production process is controlled indirectly by user 100 through client program 16.

Figure 2A:
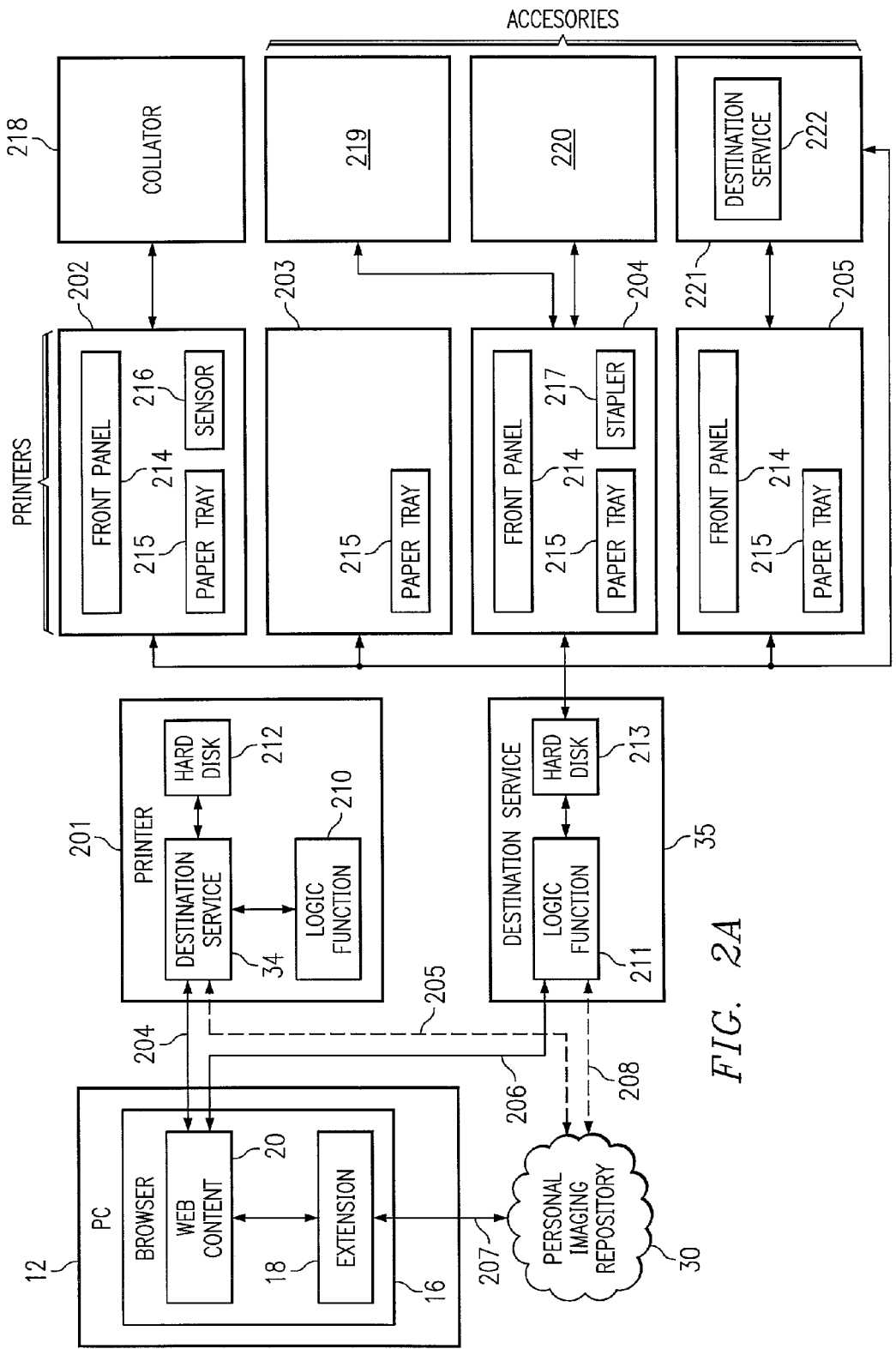
FIG. 2A is a simplified schematic diagram illustrating a configurable web-based imaging service that supports associated accessories, in accordance with the embodiments.

In accordance with embodiments of the present invention, below are detailed a number of enhancements to web based imaging systems. Particularly, systems and methods are described which facilitate paper handling on an associated web based printing device. FIG. 2A is a simplified schematic diagram illustrating a configurable web-based imaging service that supports associated accessories, in accordance with the embodiments. A user's browser 16 running on client machine 12 can access through the network various destination services, for example destination services 34 and 35, which represent production devices, e.g. printers 201–205, and provide web content 20 to browser 16. Destination services, for example services 34, 35 include respective logic functions 210, 211 interconnected with respective printers 201–205 and non-volatile memory, e.g., hard disks 212 and 213. Destination services 34, 35 each can access user's personal imaging repository 30 through web content 20 via imaging extension 18 over respective data links 204, 206, and 207. Alternatively, in some embodiments destination services 34, 35 each can access user's personal imaging repository 30 directly using a server side approach over respective data links 205, 208.

In a web based imaging environment capable of providing printing, there are two general sorts of printing device configurations. A first configuration is depicted by printer 201 that is represented by an embedded destination service 34 very specific to printer 201. A second configuration is a general purpose destination service 35 representing, for example, multiple older design printers 202–205 that do not individually include embedded destination services. Advantageously, second destination service 35 acquires knowledge of the features and operating characteristics of individual represented printers 202–205, for example, printer 202 internally supports collating (for example via attached collating accessory 218) but printer 203 does not, whereas printer 204 includes a stapler accessory 217 and so supports stapling but printer 205 does not. Each of printers 202–205 represented by destination service 35 includes a multipurpose paper tray 215, and printer 202 includes an embedded sensor 216. Printers 202, 204, and 205 each include a control panel 214.

A printer commonly has attached to it one or more third party associated accessories, depicted generically in FIG. 2A by accessories 219–221 attached to printers 204–205 represented by destination service 35. In a more general sense stapler 217 and collator 218 attached respectively to printers 204 and 202 can also be included among third party associated accessories 217–221. New accessories, which continually add functionality to existing printers, are commonly developed and/or provided by third parties. For example, a stapler stacker accessory made by Hewlett-Packard and/or a booklet maker made by a company named Duplo can be added to a base model Hewlett-Packard printer.

One possibility is for destination service 35 to ignore third party associated accessory 217–221 and for browser 16 simply to download web content 20 associated with destination service 35 into the browser. However, then the user cannot benefit from using that third party associated accessory. In a first aspect of enhanced paper handling according to embodiments of the present invention, a third party associated accessory 217–221 commonly attached to a printer influences web content 20 generated by destination service 35.

Figure 2C:
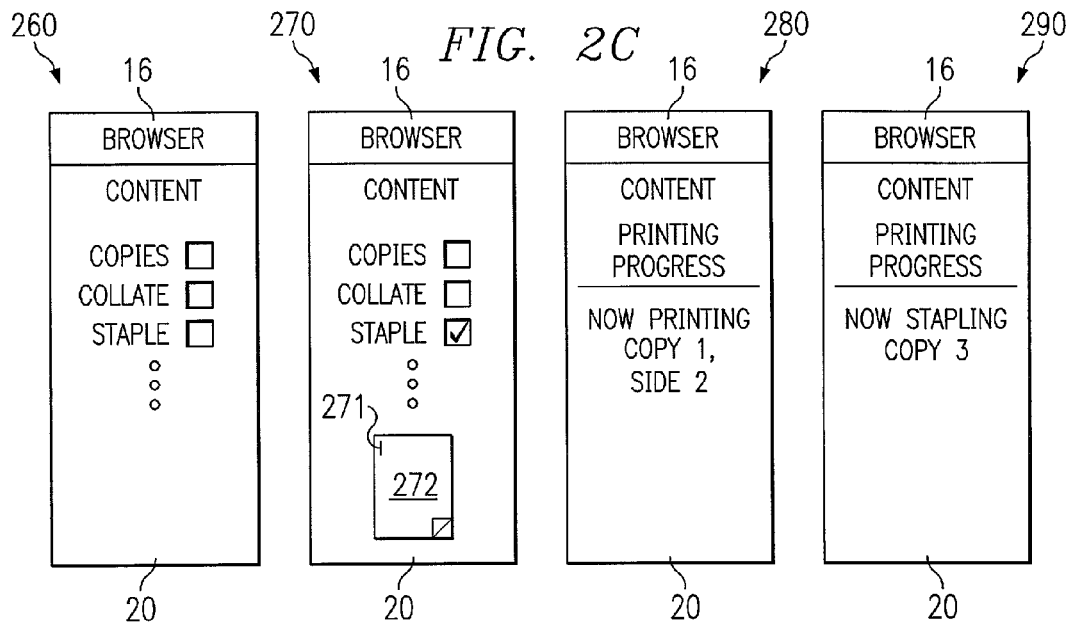
FIG. 2C is a schematic view of the browser display generated by web content at various stages of the operation depicted in FIG. 2B.

FIG. 2B is a flow diagram depicting the operation of a first aspect of enhanced paper handling, according to embodiments of the present invention. FIG. 2C is a schematic view of the browser display generated by web content 20 at various stages of the operation depicted in FIG. 2B. At block 231 of FIG. 2B, web based imaging destination service 35 requests web content influenced by handling accessory 217–221 for a production device, e.g., printer 204, 205, and at block 232 incorporates this content into the web content 20 ( or synthesizes content corresponding to associated accessory 217–221 based on information provided by associated accessory 217–221) that it downloads into client browser 16 at block 233. In some embodiments, the printer's web-based imaging destination service 35 does not understand the web content from associated accessory 217–221, but at block 232 simply integrates that content into web content 20 that it downloads at block 233 into browser 16. In some embodiments, there is a different mechanism of influence, for example, the printer synthesizes content based on information provided by the associated accessory. Typically this involves adding options to destination service web content 20 displayed in browser 16 at block 234, as illustrated for example in display view 260 of FIG. 2C. Web content 20 downloaded from the printer's destination service 35 into browser 16 reflects the presence of third party associated accessory 217–221.

In a variation, content from paper-handling accessory 217–221 includes executable content. Third party associated accessory 217–221 not only has a way of specifying or influencing web content 20, but also a way of adding to the job option settings. If a physical accessory impacts the printed image, then it is also reflected in the preview image of web content 20, as illustrated schematically by staple image 271 of preview image 272 in display view 270 of FIG. 2C. In another variation, the executable content includes a means of collecting settings and conveying those settings back to the printer (when printing is invoked). Job option settings including accessory settings are then selected at block 235, displayed as illustrated in display view 270, and conveyed to printer 204, 205, where at block 236 they implement the print job, including for example a staple or do not staple request, via a third party associated accessory logic function 211.

If there is processing status that involves the accessory, then that status can be shown as well at block 237 in dynamic "printing progress" pages provided in web content 20, as illustrated schematically in display view 280 of FIG. 2C. Advantageously, live "printing progress" web content 20 is continually updated by logic function 211 polling or otherwise communicating continually with printer 204, 205 to determine the status. Logic function 211 incorporates intelligence sufficient to update the browser display, including the status of any third party associated accessory 217–221, which contributes additional display features. For example the status display changes from a preview image and check boxes for stapling and other paper handling options as in display view 270 through a "now printing copy 1, side 1" message as in display view 280, to a "now stapling copy 3" message as in display view 290 of FIG. 2C. At block 238 of FIG. 2B the printing and accessory processing job is completed.

In a further variation, associated accessory 217–221 internally contains a destination service, for example destination service 222 contained in accessory 221, that is accessed through the printer's destination service 35. Advantageously, this enables associated accessories 217–221 to contribute web content to the web content 20 representing a printing device 204, 205, without the printing device itself requiring any specific knowledge about the accessory. This relieves the printer from need for specific knowledge of all possible associated accessory capabilities. Since the associated accessory 217–221 represents itself by providing web content, it is free to represent many capabilities, for example saddle stapling, glue binding, cutting, and stacking.

In a second aspect of enhanced paper handling according to embodiments of the present invention, web based imaging implements collated printing depending on the printer's collating capabilities. Referring to FIG. 2A, destination service 35 represents multiple printers 202–205 that do not contain their own embedded destination services. Destination service 35 needs to perform in an appropriate way for each of the diverse printers that it represents. Particularly, destination service 35 can behave differently based on the collation capability of each individual printer 202–205.

A printer typically can support collation in one of three ways—not at all, through physical means, or through logical storage means. Using logical collation, a user can for example send a 20 page document to a printer and request to print five copies of the document. The first copy it will print immediately, and as it prints each page, it generates a printer- or hardware-ready version of that page, which it stores on hard disk or in some other non-volatile memory. Each subsequent copy will then print at engine speed from the stored hardware-ready version. Alternatively, using a physical collator, page 1 for example prints to a first bin, page 1 prints to a second bin, page 1 prints to a third bin, . . . , then page 2 prints to the first bin, and the sequence repeats. An advantage is that less memory is required associated with the printing device than for logical collation, but a disadvantage is that the mechanical apparatus is more likely to break and is more expensive to build than memory based collation, where print-ready data is retained in memory on an ongoing basis.

Where the printer does not support any type of collation, as in printers 203–205, destination service 35 sends each successive electronic copy individually to printer 203–205. Accordingly, destination service 35 sends all pages of the first copy in electronic form to the printer, which will print it as if it were printing a single copy. The destination service then electronically resends all pages for the second copy, which is identical to the first copy, and repeats the process until all five copies are eventually printed. The net result is that the user obtains the same five printed copies, independent of whether the printer in use supports collation internally.

Figure 3:
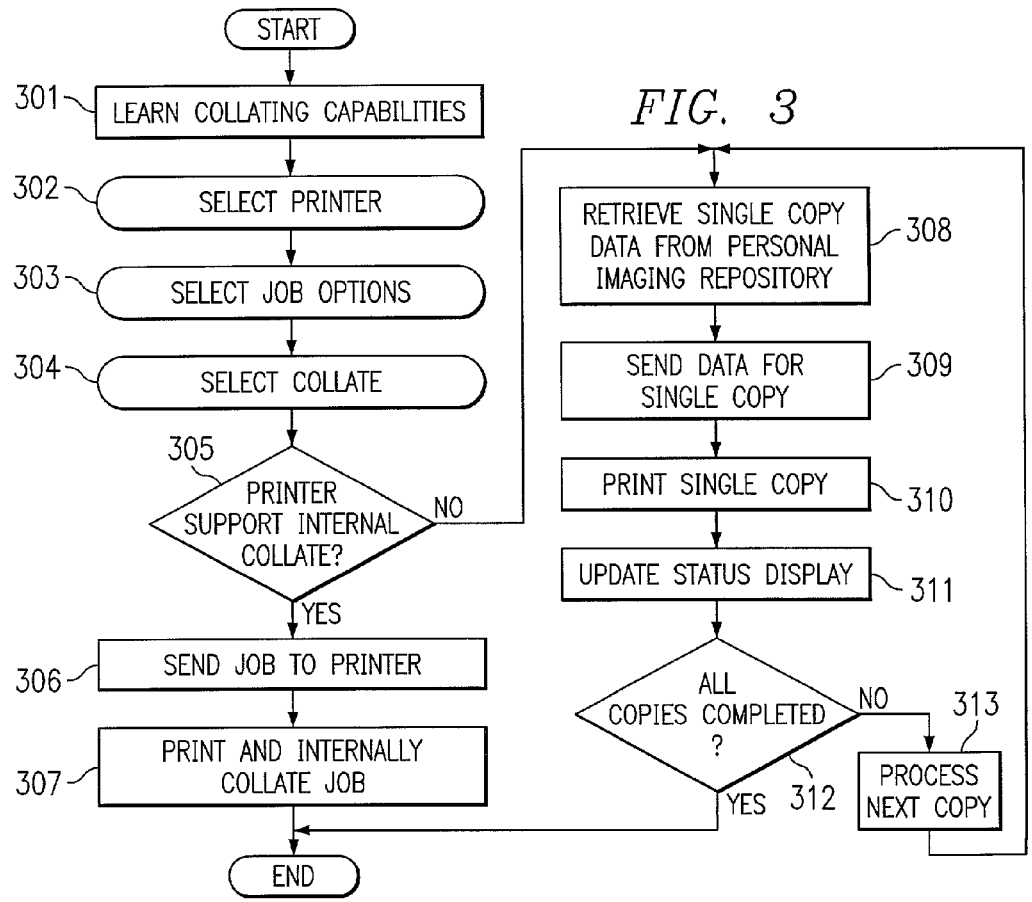
FIG. 3 is a flow diagram depicting web based imaging printing using diverse collating capabilities, in accordance with embodiments of the present invention.

FIG. 3 is a flow diagram depicting web based imaging printing using diverse collating capabilities, in accordance with embodiments of the present invention. At block 301, destination service 35 learns the kind of collating capabilities of each printer that it represents and adapts its behavior based on the printer's collating capabilities. A user has collected imaging information into user's personal imaging repository 30 and browsed to a web-based destination service 35. The user at block 302 selects printer 202–205, at block 303 selects print options including the option of printing more than one copy, and at block 304 elects to collate. The destination service performs differently, depending on whether or not the device represented by the destination service supports collated printing. In some embodiments, if at block 305 it is determined that the selected printer supports internal collation, either physical or logical, as for example depicted by collator 218 attached to printer 202, then at block 306 destination service 35 simply sends the print job to printer 202, which then at block 307 independently prints and collates the multiple copies.

On the other hand, if at block 305 it is determined that the selected printer, for example printer 205, does not support internal collation, then destination service 35 provides externally assisted collated printing by sending to printer 205 at block 309 and printing at block 310 a single copy, then repeating, i.e., once for each complete copy requested, as illustrated at block 313 until all requested copies have been printed, as illustrated at block 312. Although the externally assisted alternative is typically slower than printing with a device that supports internal collating, it nevertheless fulfills the user's expectation of obtaining collated copies. In a variation, destination service 35 displays status updates, as indicated at block 311, at the front panel of the printing device, for example to indicate which collated copy is currently printing, as illustrated in display view 280 of FIG. 2C. In a further variation as indicated at block 308, destination service 35 accesses the user's personal imaging repository 30 on a demand basis multiple times to retrieve the imaging data for externally assisted collated printing.

Advantageously, the user obtains the requested number of collated copies, regardless of whether the printing device internally supports collated printing. Independent of any particular software application, embodiments of the present invention enable existing collated printing using devices that internally support collated printing, while additionally enabling externally assisted collated printing using printing devices that do not internally support collated printing.

In a third aspect of enhanced paper handling according to embodiments of the present invention, paper handling accessories are generalized to include specialized media. Specialized media include for example certificates, letterheads, and decorated holiday paper having foil and vibrant colors that are not produced from a conventional printer, for printing holiday letters. FIG. 4A is a schematic representation of specialized media 401 and 402. Typically specialized media 401, 402 included decorated non-print areas 403, shown darkened in FIG. 4A, and text areas 404 generally left clear of decoration for printed messages. Typically, a user desires to design the text or message so that it does not print onto and obscure decorated areas 403 on specialized media 401, 402. Currently this is accomplished primarily by trial and error.

Existing printers have multipurpose trays, which fold out to receive envelopes or specialized media. A user currently folds out the multipurpose tray, inserts the specialized media, and a sensor can detect that the user has loaded the media. What does not currently exist is for the printer to know what those specialized media are. In accordance with the present invention, the user can preview a display of the text or message superimposed in register with the desired specialized media and can thus determine prior to printing whether any adjustments or corrections are necessary.

FIG. 4B is a flow diagram depicting the operation of a system and method of printing with specialized media, in accordance with embodiments of the present invention. At block 421 a user collects imaging data into user's personal imaging repository 30. At block 422, a user loads specialized media 401, 402 into multipurpose tray 215 of a printer, for example printer 202, and returns to user's browser 16. At block 423, the user accesses a web-based destination service 35 representing printer 202 containing specialized media 401, 402 in multipurpose tray 215 and capable of supporting specialized media. At block 424, destination service 35 retrieves imaging data from the user's personal imaging repository 30 and at block 425 displays print job options through web content 20 downloaded into user's browser 16. At block 426 the user selects desired job options.

In some embodiments, specialized media 401, 402 are detected by a sensor 216 when inserted into the multipurpose tray of printer 202, as indicated at block 427. Alternatively, the user selects a desire to print on specialized media, as indicated at block 428. In a variation, individual types of specialized media 401, 402 are individually encoded and are automatically identified by a scan mechanism at multipurpose tray 215 as indicated at block 429. Alternatively, as indicated at block 430, each type of specialized media 401, 402 is itemized in and selectable from a list of available media displayed in the user's browser 16 by destination service 35. As indicated at block 431, a user can, for example, select from this list the type of specialized media 401, 402 loaded into multipurpose tray 215 of printer 202. In a further alternative, as indicated at block 432, the user manually inputs into client machine 12 a code representing the type of specialized media 401, 402 loaded into multipurpose tray 215 of printer 202.

FIG. 4C is a schematic representation illustrating an implementation for scanning encoded specialized media, in accordance with the present invention. Multipurpose tray 215 includes an integral bar code scanner 216 that is used to identify specialized media 481 including a decorated area 482, a message area 483, and a bar code 484 specifying the particular media. One of the requirements for bar code scanning is relative motion between the bar code and the scanning sensor. For example, to scan a particular bar code, a scan wand goes across the code, or an engine moves the scan sensor back and forth as in a point of sale system. Alternatively, the bar code can be moved over the scanning sensor. The act of inserting specialized media 481 into multipurpose tray 215, indicated by direction arrow 485, itself causes scanning motion to take place, eliminating the need for a separate scanning mechanism and enabling the printer to perform a bar code scan internally in its multipurpose tray. In this fashion the printer learns what kind of media is in the multipurpose tray, because the printer has read the bar code.

In another variation, inks "visible" only through infrared scanning mechanisms are used to encode the information identifying the media. In some variations the bar code is printed on the specialized media using an infrared ink or toner detectable only using an infrared-sensitive scanning sensor but not detectable using visible illumination. In other variations, the bar code is visible but is located on the reverse (non-print) side of the specialized media sheet.

In another variation, when the user adds or removes specialized media at multipurpose tray 215, the media will become available or unavailable through the web-based destination service 25 (if unavailable, then a default medium is made available). In a further variation, a specialized media is automatically selected when the user inserts it into multipurpose tray 215. In another variation, the specialized media is automatically selected if the specialized media is already in multipurpose tray 215 when the user accesses web-based destination service 35.

Destination service 35 interprets the bar code scan or the media code otherwise obtained to access a graphic or image that represents the particular print media. In some variations, the graphic or image representing specialized media 481 is retrieved from an imaging store local to destination service 35, as indicated at block 433 of FIG. 4B. In other variations as indicated at block 434, the media code can specify the URL of a web page on the Internet associated with the particular specialized media. In a variation, graphics representing each of the media are downloaded from the Internet into a local imaging store accessible to destination service 35 through information encoded on the specialized media.

After the media image is retrieved by destination service 35 representing printer 202, at block 435 web content 20 running in browser 16 displays a preview of the print job in the context of how the job will look when it is ultimately printed on the particular media. To provide a more realistic preview display, the image of the print job is superimposed in register onto an image of the selected specialized media, such that the user can determine in advance if the text prints onto decorative image areas along the side, for example, and can thus avoid wasting a sheet of specialized media. This is analogous to displaying a preview of a print job in the context of other selected job options and/or accessories in web-based imaging printing. Accordingly, specialized media 401, 402 can be recognized as particular examples of generalized printing accessories or options.

After viewing the preview display at block 435, the user has the option to select print at block 436, which starts processing of the job at block 437. In an inexpensive but reliable variation, a sensor associated with the multipurpose tray uses the act of inserting specialized media to provide scanning motion only to detect, but not to preview, specialized media.

Embodiments of the invention allows the user simply to insert specialized media into the special purpose tray and use that specialized media in a seamless fashion. By accessing an image specified by a media code, the device seems to "know" about the specialized media, providing a means enabled through web-based imaging of easily and accurately using specialized media. In some variations, the scanning mechanism is simplified, reducing cost.

The system and method provide printing from a web application that is independent of the configuration of the operating system. In addition, since the print destination server can return with specific print content that relates to a selected device, the present invention allows a preview of the print job in the context of the devices and/or services offered by the print destination server.

Figure 5A:
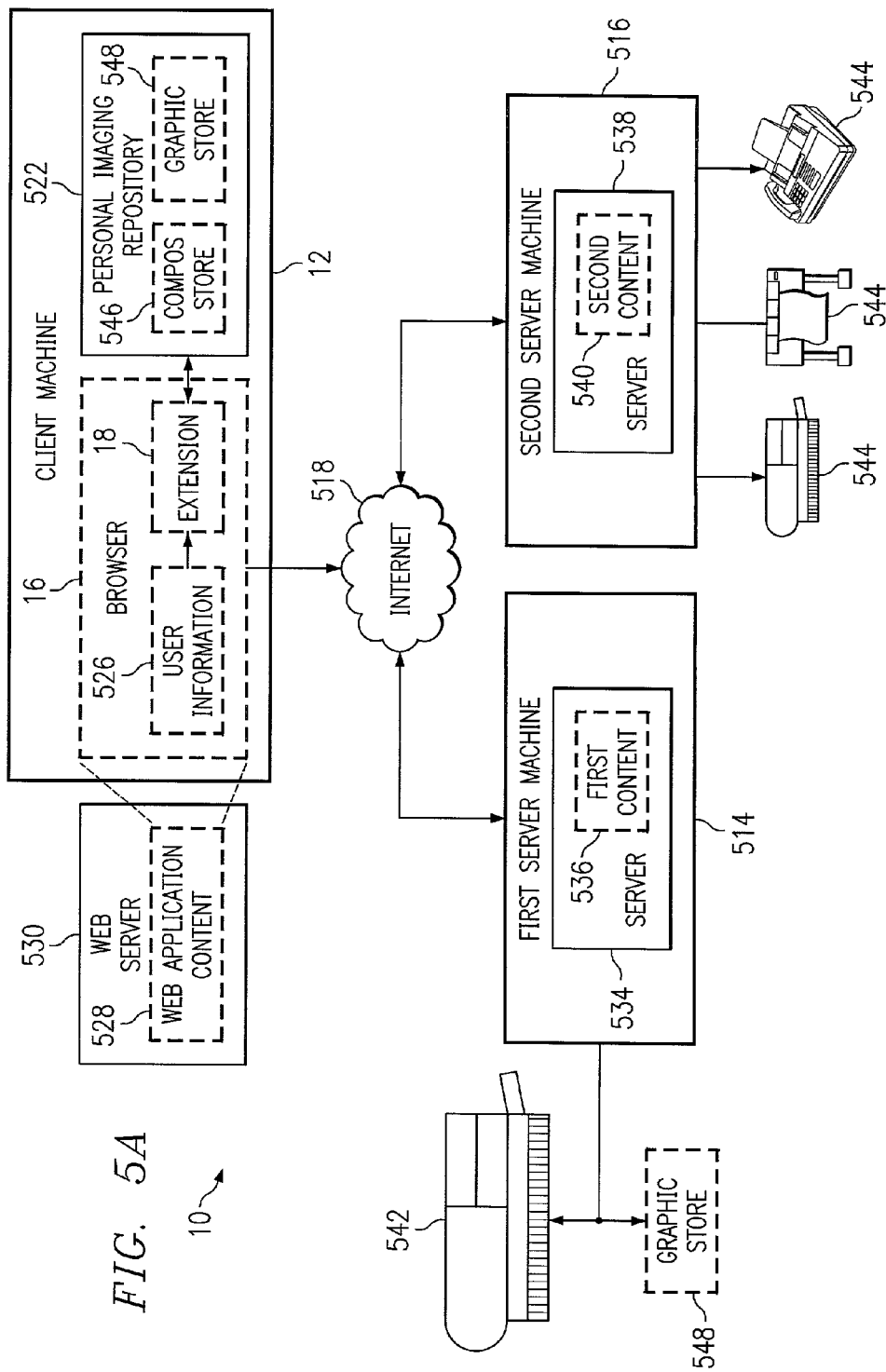
FIG. 5A is a schematic diagram depicting a client-server network system in accordance with embodiments of the present invention.

FIG. 5A is a schematic diagram depicting client-server network system 10 in accordance with embodiments of the present invention. Client machine 12 is connected to first server machine 514 and second server machine 516 via Internet 518. Client machine 12 includes client program (browser) 16 and preferably personal imaging repository 522. Browser 16 further includes extension component (imaging extension) 18 that makes use of user information 526 in order to provide an interface between content executing in browser 16 and personal imaging repository 522. More specifically, user information 526 is used for associating accesses through extension component 18 with the appropriate user's personal imaging repository. It should be noted that the user profile can associate different users or groups with personal imaging repository 522. For example, the user profile can associate a single user with a particular personal imaging repository, but, at the same time, this user can also have multiple user profiles, resulting in multiple personal imaging repositories associated with a single user. Similarly, the user profile can associate a group having multiple users with a particular personal imaging repository. A personal imaging repository, in this scenario, can be used by a group having a common association, such as a group project. As described, the user profile can be defined with great discretion and flexibility, and the above implementations are contemplated and within the scope of the present invention.

Although the preceding description defines the user profile broadly, it should be understood that in the present embodiment each user has one personal imaging repository. A personal imaging repository will not typically be associated with groups—it will typically be associated only with individuals, but could optionally allow several individuals to use the same repository. This personal imaging repository is defined by all the information and services that are relevant to performing imaging operations for the particular user. The "root" of a user's personal imaging repository is one or more user profiles, which are associated with the user through one or more sets of user information. The present invention is directed to implementing the concept of allowing a user's information to follow him/her around, i.e., be accessible from a variety of different locations, both inside a firewall and outside of the firewall, as well as from a variety of different machines.

Imaging extension 18 is configured to respond to the execution of generic access instructions from web application content 528 by generating/mapping these generic instructions to corresponding imaging client-specific commands of imaging client 16. However, this will happen only if user information 526 (containing references to the user's profiles) is available to imaging extension 18, to access the user's personal imaging repository 522.

Imaging extension 18 can be regarded and implemented as an application programming interface (API). The API used for imaging extension 18 is preferably structured in accordance with a system wide standard. The generic access instructions for example from web application content 528, when executed, can cause imaging extension API calls to be issued to the API in order to access the user's personal imaging repository 522 via imaging client-specific instructions. It will be recognized by those of ordinary skill in the art that there are other ways (both hardware and software) to implement this same functionality. Embodiments of the present invention are not limited to any one way. In essence, imaging extension 18 provides means for accessing user information 526 and for providing an opaque interface between web application content 528 executing in browser 16 and personal imaging repository 522 and other functionalities of imaging client 16. An example implementation of the imaging extension will be discussed in more detail below.

In operation, browser 16 initially accesses a web site and using appropriate request commands (HTTP for the current generation of browsers), downloads web application content 528 therefrom, which includes a set of executable instructions intended to be executed in browser 16 to provide browser 16 with predetermined functionality. These executable instructions comprise generic access instructions (see definition above), which are system wide instructions expressed in some language (i.e., JAVA™), that call the resources of an imaging extension API to access the user's personal imaging repository 522 to perform web imaging operations. Such generic access instructions can be, by way of example but not by way of limitation, JAVA™, JavaScript™, and C-sharp instructions. A system wide standard preferably manifested as an API or set of APIs typically specifies "generic access instructions," "generic access requests," and "target graphics."

A variety of functionality can be provided by web application content 528 including, for example, executable instructions for imaging client 16 to display target graphics, i.e., show available graphics on the accessed web site. Another web application content can include executable instructions for displaying a print button, and if the print button is clicked, causing imaging client 16 to generate a print job that describes a graphic in the personal imaging repository 522 of the user and transmits the print job, for example, to printer 542. A web application content can also provide a preview of the target graphic. Accordingly, web application content 528 refers to a set of executable instructions that are downloaded into browser 16 to perform a service requested by the user.

Browser 16 executes web application content 528, whether it is HTML interpreted and/or executed by browser 16 into marks displayed on a user's display, or JAVA™ and JavaScript™ or some other appropriate language. As previously noted, web application content 528 contains executable instructions that use the API provided by imaging extension 18 to indirectly access the user's personal imaging repository 522. For example, the executable instructions of the web application content can obtain an opaque access to the information from the user's profile (in order to specify the user's personal imaging repository) by interacting with a user profile store service (not shown).

In the discussion herein, the term "opaque reference" is used. An "opaque reference" is a reference that does not expose information about an underlying resource. The possessor of an opaque reference is unable to determine anything about the resource from the opaque reference or to modify the opaque reference so as to alter which resource is being referenced. (In contrast, if a URL is provided, for example, "http://www.hp.com", it would be fairly straightforward for the web application content to modify the URL to refer to a different resource, for example, "http://www.other.com".)

The executable instructions of web application content 528 perform this access to obtain an opaque reference to the user's composition store 546 and graphic store 548. The web application content can further use the API provided by imaging extension 18 to add a new graphic to graphic store 548 via opaque reference.

Imaging extension 18 is configured to prevent web application content 528 (i.e., the executable instructions from web service 530), from directly accessing arbitrary services and the user's personal imaging repository 522. In essence, web application content 528 uses imaging extension 18 as a gateway to access everything in the user's personal imaging repository 522, including the information in the user profile.

This restricted access imposed on web application content 528 can be implemented using a variety of methods. The designer can implement the API for imaging extension 18 such that the API only accepts references from web application content 528 that were previously provided thereto by imaging extension 18. In essence, web application content 528 is then unable to supply references arbitrarily when calling the API provided by imaging extension 18. Web application content 528 running on imaging client 16, in order to communicate with imaging client resources and with user's personal imaging repository 522, must first obtain opaque references using the API of imaging extension 18. For example, if web application content 528 wants to access graphic store 548, web application content 528 is required to call a method (provided by the API of the imaging extension 18) that provides an opaque reference to graphic store 548. This reference can then be used in subsequent calls by web application content 528 to the API of imaging extension 18.

One approach to accomplishing this restriction is to create a session. For example, an imaging extension API for a particular operation might comprise:

CreateParticularOperationSession( ): returns SessionID

PerformOperation(Parameter, SessionID id): returns Boolean (which indicate a result)

DeleteParticularOperationSession (SessionID)

Accordingly, web application content 528 is required to call the imaging extension API to first create a session by calling CreateParticularOperationSession, which returns a SessionID. This SessionID is subsequently used to refer to the particular session. Next, web application content 528 calls the PerformOperation in the imaging extension API with particular input and the SessionID. Web application content 528 can perform a variety of manipulations, but cannot directly access parameters and operations which are "associated" with the SessionID, because the association is accomplished in a way that is "opaque" to the client. The imaging extension API and that API alone knows how to use the SessionID to determine/map to imaging client parameters. Often, the SessionID will be a reference such as a pointer to a data structure containing information relevant to the session. This data structure can contain parameters and other pertinent information. When web application content 528 has completed its operation, web application content 528 calls DeleteParticularOperationSession in the imaging extension API with the SessionID as a parameter. This instructs the imaging extension API to free whatever resources (such as memory) are associated with the session. Note that if web application content 528 changes the SessionID, that will not allow web application content 528 to obtain restricted parameters, but will only confuse imaging extension 18 with the changed previously unseen SessionID.

The API provided by imaging extension 18 is typically implemented as a library of methods that provide controlled access to an API provided by the network services participating in user's personal imaging repository 522. This API is implemented to invoke the API provided by the user profile store, composition store 546, and graphic store 548. The API provided by imaging extension 18 is generally not accessed through remote invocation technology, although remote invocation technology can be implemented to access the APIs provided by the network services participating in the user's personal imaging repository 522. The API provided by imaging extension 18 is not an exact replication of APIs provided by the user profile store, composition store, and graphic store, since this API provides controlled access to those network services through (among other techniques) opaque references.

From the above description, it can be seen that web application content 528 is prevented from using the API provided by imaging extension 18 to access arbitrary services. The key to this restriction is that web application content 528 cannot supply the addresses for these arbitrary services. Web application content 528 can only refer to services through opaque references provided by the imaging extension API (not exposing the actual reference/URL to web application content 528). For example, web application content 528 can use the API to obtain a list of opaque references to available compositions. This list of opaque references instead would map to the real references/URLs in imaging extension 18, alone. Thus, in subsequently referring to these compositions, web application content 528 cannot supply a URL (which might be one of its own creation), because that created URL cannot map within imaging extension 18 to real resources. Instead, web application content 528 is required to use only references provided to it by the API, which make sense only in the context of the current session with that API. This restriction can be relaxed in circumstances where web application content 528 provides references to resources available from the same network service in which web application content 528 originated. This is permitted, because web application content 528 already has a measure of access to the web service from which it originated (either when originally generated or subsequently), thus not acquiring any special access not already available to web application content 528.

Browser 16 uses web application content 528 that is provided by web server 530. When the user selects "print" in the web application content, web application content 528 among other things directs browser 16 to the print destination. Although one client machine 12 and two server machines 514, 516 are shown as examples, a broader implementation can involve multiple server machines to which client machine 12 has access and can communicate. For better readability, a single client machine, server, production device, e.g., printer, or application has been and will be referred to and shown herein. However, it should be understood by showing only one or by the use of "a" that what is meant is "one or more". For example, although a single printer has been and will be described and shown, this printer may actually be a plurality of printers forming a printing resource. In such a situation, it is understood that the present inventive concepts apply.

First server machine 514 includes first server 534. When browser 16 is directed to first server 534 addressed by a unique Uniform Resource Locator ("URL"), first content 536 is served by the first server to browser 16. Each content 536 is preconfigured with specific instructions depending on the type of service the server machine represents. Similarly, second server machine 516 includes a second server 538 with a second content 540. Generally, the contents 536, 540 are different, because the services and/or access to devices provided by the servers are different. In FIG. 5A, first server machine 514 is connected to single printing device 542, whereas second server machine 516 serves multiple printing devices 544. Consequently, first content 536 and second content 540 are different from one another, each including separate instructions to browser 16.

Although it is shown that the servers represent only printing devices in this example, the server can represent other services. For example, the server can be an auction web site, such as ebay.com, which makes an auction page for the user when a graphic file is printed to the web site, or a check writing service. In embodiments of the present invention, the user can "print" to any one of many services. As a result, the use of the word "print" is intended to have a broad definition, which can be applied to many available devices or services. Whatever the services and/or device the servers provide, the content can include the instructions needed for the configuration. It is advantageous that a personal imaging repository 522 be implemented according to the present invention, to store data that can be accessed by these servers.

In the present embodiment, personal imaging repository 522 includes composition store 546 for storing composition (s) of the imaging data that are serviced as a single unit and an graphic store 548, i.e., digital memory, for storing the imaging data. An imaging composition generally comprises links to the imaging data (also known as graphics), which can be located at another service or services. Accordingly, composition store 546 stores only the imaging compositions. Graphic store 548, on the other hand, is any imaging data store located on any computer that contains the graphics. More specifically, each web service can have its own graphic store 548 available to the public.

For example, at some earlier time a user can print an article from a web service site, resulting in an imaging composition being created and stored in the user's composition store 546. The imaging composition contains only the link to the graphic for this article stored for example on first web service site 514. Consequently, the graphic for the article is not in the graphic store 548 located on client machine 12. Rather, the graphic is stored in a graphic store 548 located on web service site 514. Users will have a graphic store 548 that belongs to their user identification, where they can store imaging data, which is graphic store 548 shown in client machine 12. As a result, the term "personal imaging repository" 522 is a conceptual term for an exchange infrastructure between the imaging data and the available web services on Internet 518. Similarly, the term "web" denotes millions of distinct servers that comprise the web. However, the web does not actually do anything itself. In embodiments of the present invention, the servers serving composition store 546 and graphic store 548 are physical implementations of the personal imaging repository as a concept.

It should be noted that personal imaging repository 522 can represent any type of data storage device. In fact, the data storage device of personal imaging repository 522 does not necessarily have to be located with client machine 12. Personal imaging repository 522 can be located, for example, on another machine or segmented and distributed among multiple machines, which client machine 12 can access through Internet 518. Although it is frequently advantageous to include personal imaging repository 522 with client machine 12, this can change as data rates become faster and the popularity of personal digital assistant ("PDA") devices increases. These alternative implementations are considered to be within the scope of the present invention.

Figure 5B:
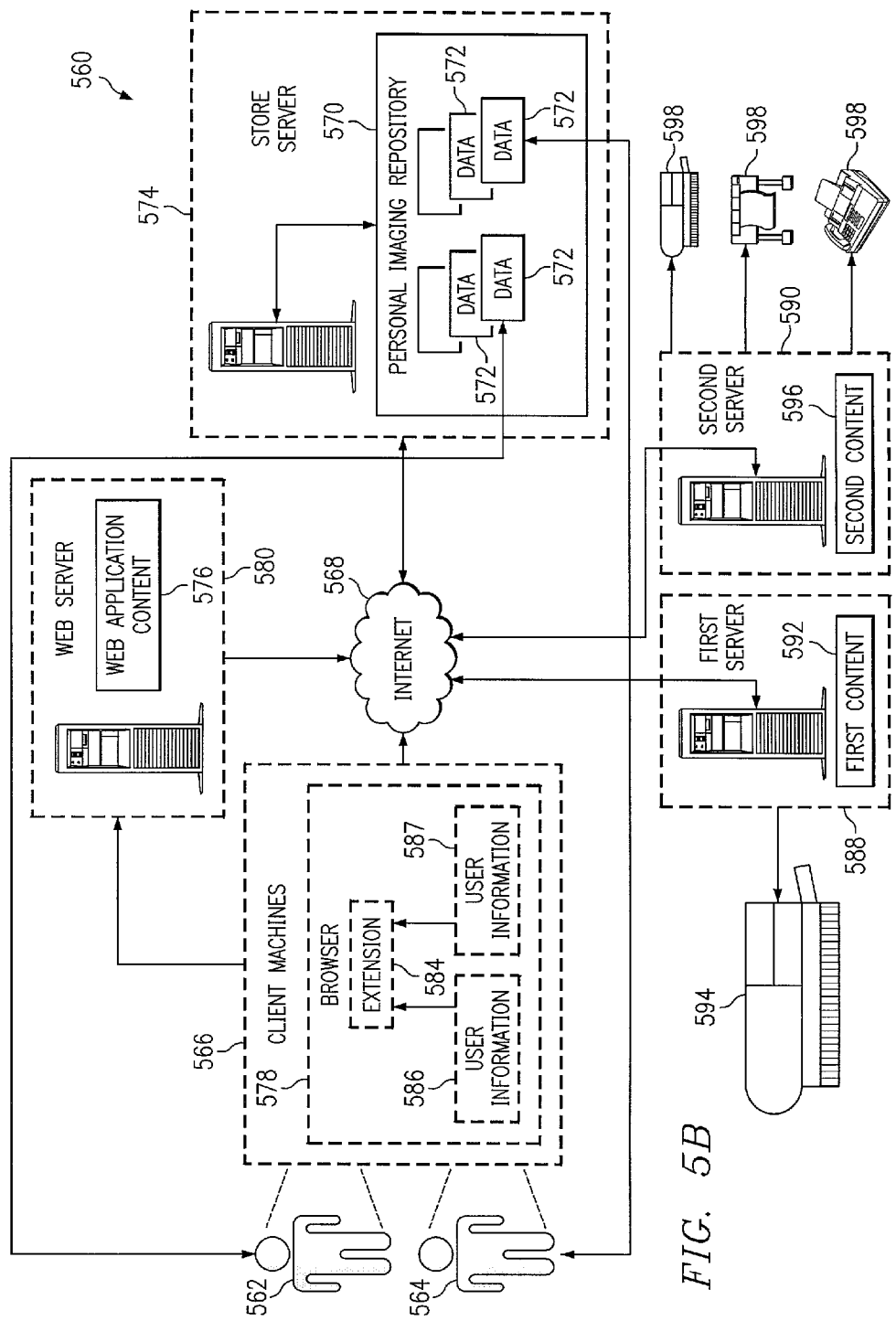
FIG. 5B is a schematic diagram depicting a variation of the client-server network system of FIG. 5A, which is tailored to faster data rates or limited client machine storage capacity.

FIG. 5B is a schematic diagram depicting a variation 560 of the client-server network system of FIG. 5A, which is tailored to faster data rates or limited client machine storage capacity. In this implementation, multiple users 562, 564 utilize the same client machines 566 through Internet 568. In this implementation, client machines 566 can include client computers that have less storage memory, such as a Personal Digital Assistant ("PDA") or a laptop. Because of limited storage memory, personal imaging repository 570 for storing user's data 572 is located on a separate computer 574, which can be a server computer or just a linked client machine 566. In this example, separate computer 574 is a server, which will be herein referred to as store server 574 to distinguish it from other servers for printing. Users 562, 564 are assigned distinct user profiles (not depicted explicitly in FIG. 5B) for accessing personal imaging repository 570 through store server 574. The user profile (or profiles) is part of the user's personal imaging repository. Users 562, 564 each have a distinct personal imaging repository, although only a single personal imaging repository 570 is depicted explicitly in FIG. 5B. Although not shown, personal imaging repository 570 can similarly be implemented with a composition store and a graphic store, where user's data 572 can be stored. User's data 572 is broadly interpreted to include one or more user profile store services, one or more composition store services and/or one or more graphic store services.

In operation, a first user 562 initially accesses system 560 with a login name and password. Once first user 562 has accessed system 560, the first user then also has access to the personal imaging repository 570 that is linked to this first user's login name. Similarly, if a second user 564 logs in with a login name and password, the second user has access to system 560, including the personal imaging repository 570 that belongs to this second user's login name. In this implementation, users can access system 560 and their personal imaging repository 570 from any computers that have a browser and Internet access. As a result of the flexibility of the Internet, it is possible for users to access system 560 and their personal imaging repository 570 using a standard PDA and/or wireless web phone.

Web application content 576 can be used by the users through a browser 578 that is located on client machine 566. Similar to the previous implementation, web application content 576 is provided through web server 580. Browser 578 also contains extension 584 for accessing user information 586, 587 that associate the different user profiles assigned to users 562, 564 with their respective personal imaging repositories. User information is different from a user profile. User information references one or more user profiles associated with a particular user. As shown, each user profile has its own user information. Alternatively, the user information can also contain information for two or more user profiles. These other variations are contemplated and are within the scope of the present invention.

Users can access a variety of servers on the Internet for the printing of the target data from web application content 576. In this example, there is first server 588 and second server 590. First server 588 provides first print content 592 representing single printing device 594, and second server 590 provides second print content 596 representing a plurality of printing devices 598.

Upon the user selecting PRINT or PRINT PREVIEW from web application content 576, web application content 576 first directs browser 578 to request a specific URL, which references a web page located on web server 580. Shown as an example in FIG. 5B, a user creates a document using web application content 576, and from web application content 576 the user can elect to PRINT the document (i.e., the target data).

In response to receiving the request for the web page specified by the aforementioned URL, web server 580 constructs an imaging data of the target data. An imaging data refers to the printed output of the target data, which does not necessarily look the same as the target data, depending on the behavior of web application content 576. This step of constructing an imaging data may not be necessary, and depends on the implementation and configuration of the print destination. For example, if sending a graphic file to the earlier example of an auction site for making an auction page with the graphic file, an imaging data might not have to be generated. Instead, print destination server 588, 590 can accept the target data without further modification for compatibility. However, since it is hard to foresee what type of graphic files the web site will accept, the exemplary method is implemented with the intermediate step of constructing imaging data to guarantee uniformity and compatibility. Formats for the imaging data include JPEG, Graphics Interchange Format ("GIF"), Portable Network Graphics Format, Tagged Image File Format ("TIFF"), PDF and Microsoft Windows bitmap format ("BMP").

After web server 580 constructs the imaging data for the target data, web application content 576 transfers the imaging data to personal imaging repository 570. It is then determined whether personal imaging repository 570 is located on client machine 566 or on store server 574. If personal imaging repository 570 is located on the client machine 566, the imaging data is saved to personal imaging repository 570 without further connection. If, however, personal image repository 570 is located on store server 574, client machine 566 will connect to store server 574. It is then determined whether the connection is successful before a timeout, and client machine 566 will keep trying to connect to store server 574 until a timeout or successful connection occurs. Once the connection with store server 574 is successful, client machine 566 transfers the imaging data to store server 574 for storage in personal imaging repository 570.

After the imaging data is stored in personal imaging repository 570, web application content 576 directs browser 578 to the server indicated by print destination 594, which will be referred to as print destination server 588. It is next determined whether print destination server 588 is available for printing. An error message is sent to browser 578 if the print destination server 588 is not available. If, on the other hand, print destination server 588 is available, it will respond to browser 578 by returning a print content 592, which will be displayed on browser 578 for user configuration. Print content 592 is generally a web page that is designed according to the services that this print destination provides. Furthermore, there are a number of ways to implement print content 592, depending on the services available. For example, print content 592 can be configured to display a list of imaging data stored in personal imaging repository 570. In this scenario, print content 592 accesses personal imaging repository 570 to obtain the list for display to the user. The above described variations are contemplated and should be considered within the scope of the present invention.

As an example, if print destination server 588, 590 represents multiple printing devices, a page of the print application content may contain all the printing devices 594, 598 that are available for user selection. From this page of the print content the user selects a printing device, and another page is returned to the user with the imaging data and the configurations that are available for this particular printing device. Through the print content, the user is able to print or print preview the imaging data according to the configurations of printing devices 598. In the auction site example, users can preview the auction page that they configured before posting onto the auction list. As shown, the print content can be returned with multiple pages depending on the need of the services provided by the print destination server.

Once the user-selected configuration is finalized, the user can then select to PRINT or PRINT PREVIEW from print content 592. Print content 592 accesses the imaging data from personal imaging repository 570, and transfers the imaging data with the specified user configuration to print destination server 588, through which the imaging data is printed or displayed according to the specified configurations including selected printing device 594. At the end, the print content can return a status page to indicate successful output at the printing device.

Personal imaging repository 570 is an example of the notion of "identity." The user has a network "identity" through which he/she is represented. Personal imaging repository 570 contains information associated with the user's identity. The foregoing description addresses a computing environment in which imaging extension 584 is used to make user information available to web content 592, 596 downloaded into browser 578. Imaging extension 584 makes information associated with the user's identity available. The primary purpose of imaging extension 584 is to provide access to information that is identified by user specific information 586, 587. In essence, this is a client-side approach to identifying user information.

Although it is possible to extend browsers on Windows operating systems, it becomes harder to do this for newer devices like PDAs. Consequently, it is desirable to support the notion of identity without requiring the browser to be extended. Alternatively, a server-side approach to identifying user information is possible. This can be accomplished by moving the logic normally present in web content 592, 596 running within browser 578 into web server 588, 590. Rather than web content 592, 596 accessing services specific to the user, web server 588, 590 directly accesses services specific to the user. In other words, the identity technology is server side instead of client side.

When using server side identity technology, because browser 578 no longer provides information regarding a user's identity, an "authentication website" can be used to provide such information. In such an arrangement, web content 592, 596 redirects browser 578 to the authentication website, which determines the identity of the user and then redirects browser 578 back to the web content 592, 596 with the user identity, including the location of the user's profile. For this purpose, it is assumed that all web imaging destinations have information regarding the authentication server. Once the user's identity is determined (i.e., the location of the user's profile is known), then web imaging destination can interact directly with services specific to the user, without intervention of imaging extension 584.

What is claimed is:

1. In a web based imaging environment, a method of incorporating content downloaded into a user's browser reflecting the influence of an accessory associated with a printer represented by a destination service, said method comprising the steps of:
   accessing a destination service from a user's browser associated with said user's image data;
   acquiring, from said associated accessory, content influenced by said associated accessory and not known to said printer;
   incorporating said content influenced by said associated accessory into the content of said destination service;
   downloading said content from said destination service incorporating said content influenced by said associated accessory into said user's browser;
   retrieving said user's image data;
   displaying at said user's browser production options including options relating to said associated accessory for processing said user's image data;
   selecting at said user's browser production options including options relating to said associated accessory; and
   implementing processing of said user's image data using said printer and said associated accessory in accordance with said selected production options.

2. The method of claim 1 further comprising displaying status dynamically during processing of said user's image data, said status display including the status of said associated accessory.

3. The method of claim 1 wherein said content from said associated accessory includes executable content.

4. The method of claim 3 wherein said destination service does not understand said content obtained from said associated accessory.

5. The method of claim 1 wherein said step of acquiring content comprises synthesizing content from data obtained from said associated accessory.

6. The method of claim 1 wherein said associated accessory internally contains a destination service.

7. The method of claim 6 wherein said internally contained destination service is accessed through said destination service representing said printer.

8. The method of claim 1 wherein said associated accessory is a third party accessory.

9. The method of claim 1 wherein said user's image data is retrieved from said user's identity.

10. The method of claim 1, wherein said associated accessory is a print media-handling device.

11. In a web based imaging environment, a destination service representing a printer having an associated accessory, said destination service operable to:

acquire, from said associated accessory, content influenced by said associated accessory and not known to said printer;

incorporate said content influenced by said associated accessory into the content of said destination service download said content of said destination service incorporating said content influenced by said associated accessory into a user's browser associated with said user's image data;

retrieve said user's image data;

display at said user's browser production options including options relating to said associated accessory for processing said user's image data;

select interactively at said user's browser production options including options relating to said associated accessory; and implement processing of said user's image data using said printer and said associated accessory in accordance with said selected production options.

12. The destination service of claim 11 further operable to display status dynamically during processing of said user's image data, said status display including the status of said associated accessory.

13. The destination service of claim 11 wherein said content obtained from said associated accessory includes executable content.

14. The destination service of claim 11 wherein said destination service does not understand said content obtained from said associated accessory.

15. The destination service of claim 11 further operable to synthesize said content influenced by said associated accessory from data obtained from said associated accessory.

16. The destination service of claim 11 wherein said associated accessory internally contains a destination service.

17. The destination service of claim 16 further operable to access said internally contained destination service.

18. The destination service of claim 11 wherein said associated accessory is a third party accessory.

19. The destination service of claim 11 wherein said user's image data is retrieved from said user's identity.

20. A system for controlling an accessory associated with a printer, said system comprising:

a user's browser associated with said user's image data;

a printer having an associated accessory; and a destination service representing said printer, said destination service accessible from said user's browser and operable to acquire, from said associated accessory, content influenced by said associated accessory and not known to said printer, incorporate said acquired content into content associated with said printer, and download said content associated with said printer incorporating said acquired content into said user's browser.

21. The destination service of claim 11, wherein said associated accessory is a device that does not print said user's image data.

22. The system of claim 20 further comprising a means of web based imaging, said means coupled with said user's browser and with said destination service.

23. The system of claim 20 wherein said destination service is remote from said user's browser.

24. The system of claim 20 wherein said associated accessory internally contains an internal destination service.

25. The system of claim 24 wherein said destination service representing said printer is operable to access said internal destination service.

26. The system of claim 20 wherein said associated accessory is a third party accessory.

27. The system of claim 20 further operable to synthesize said influenced content from data obtained from said associated accessory.

28. The system of claim 20, wherein said associated accessory is a print media-handling device.

29. The system of claim 20, wherein said associated accessory is a device that does not print said user's image data.

* * * * *